April 26, 1966    W. JUNKERMANN ETAL    3,248,299
NUCLEAR REACTOR CORE ASSEMBLY

Filed June 12, 1961            2 Sheets-Sheet 1

INVENTORS
Wolfgang Junkermann
Arno Müller
BY
ATTORNEY

April 26, 1966  W. JUNKERMANN ETAL  3,248,299
NUCLEAR REACTOR CORE ASSEMBLY
Filed June 12, 1961  2 Sheets-Sheet 2

INVENTORS
Wolfgang Junkermann
Arno Müller
BY
ATTORNEY

United States Patent Office 3,248,299
Patented Apr. 26, 1966

3,248,299
NUCLEAR REACTOR CORE ASSEMBLY
Wolfgang Junkermann and Arno Müller, Oberhausen, Rhineland, Germany, assignors to Babcock & Wilcox, Limited, London, England, a company of Great Britain
Filed June 12, 1961, Ser. No. 116,447
2 Claims. (Cl. 176—85)

This invention relates to assemblies for nuclear reactor cores which are comprised of a plurality of blocks of reactor moderator material having plane sides faces parallel to the core axis, the faces of laterally adjacent blocks being in contact. Such assemblies may provide the structure both of the core and of the reflector surrounding the core. This construction permits relative movements to take place at any part of the core between adjacent blocks, so that stresses that may arise within the core or reflector during operation of the reactor may be relieved. Such stresses may be caused, for example, by differential thermal expansion or by dimensional increases caused by the Wigner effect or by dimensional contractions. Regard must be had to the possibility that gaps will develop between adjacent blocks which will, to unforeseeable extents, vary the properties of the assembly such as the neutron leakage therefrom, or by providing undesired and unpredictable paths for coolant gas intended to be confined to fuel channels. Further the present invention provides bracing of blocks laterally against one another by a plurality of bracing bands or garters encircling the assembly at different locations along its length and maintaining each in tension. Such garters, being independent of one another, do not effectively brace the assembly as a whole, and more effective bracing of the assembly may be desirable, particularly e.g. for reactors mounted in vehicles or reactors in localities subject to earthquakes, where external forces may act on the assembly in ways that would otherwise distort the shape of the structure or disarrange blocks in the assembly.

Accordingly, the present invention provides, in a nuclear reactor core assembly having co-axial forces acting thereon, the assembly comprising a plurality of moderator blocks having plane side faces parallel to the core axis, a bracing means adapted to laterally force the blocks against one another, and a wedge means adapted to apply a portion of the co-axial force to the bracing means to effect the lateral force.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of the invention.

Figure 1:
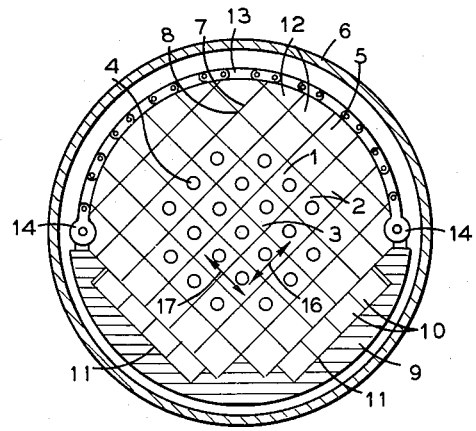
FIGURE 1 is a sectional end elevation of a nuclear reactor core and reflector comprising square-section graphite blocks mounted wthin a pressure vessel.
Figure 2:
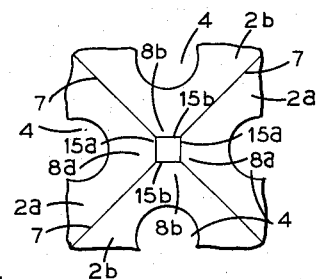
FIGURE 2 is a representation to a larger scale of part of FIGURE 1 showing adjacent edges of four blocks.
Figure 3:
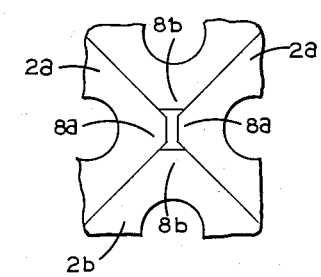
FIGURE 3 shows the blocks of FIGURE 2 in displaced positions.

Referring to FIGURES 1 to 3 of the drawings, a gas-cooled, graphite-moderated nuclear reactor includes a core assembly 1 of graphite moderator blocks 2, of which the blocks in the core 3 or chain-reacting region of the reactor are axially pierced to provide channels 4 for the accommodation of reactive fuel elements (not shown) and for the passage of coolant gas past said fuel elements. The blocks in the reflector 5 or region surrounding the core are unpierced. The graphite block assembly 1 is located within a cylindrical pressure vessel 6 arranged with its axis horizontal.

The graphite blocks are elongated and arranged with their axes horizontal. All the blocks in the core 3 and the majority of blocks in the reflector 5 are manufactured to the same square cross-section and they are assembled with the plane side faces 7 of laterally adjacent blocks in contact and with the corners 8 of laterally adjacent blocks adjacent and oriented so that the diagonals between corners are respectively vertical and horizontal. The block assembly 1 is supported in the pressure vessel 6 on a supporting cradle or framework 9 of suitable construction, which is of generally semi-cylindrical form co-axial with the pressure vessel and spaced from the pressure vessel wal. Some of the square-section blocks of the lower part of the reflector rest directly on the cradle 9, while the assembly includes rectangular-section graphite blocks 10 in the lower part of the reflector which are housed in recesses 11 in the cradle respectively to one side and to the other side of the cradle axis and on which adjacent square-section blocks of the reflector rest.

The remaining graphite blocks of the assembly consist of reflector blocks 12 around the upper periphery of the assembly which contact one another and the adjacent square-section blocks exactly as in the array of square-section blocks and differ from the square-section blocks only in that their radially outer faces are shaped so that the upper surface of the assembly is evenly spaced from the pressure vessel wall. Restraining means 13 of any suitable construction extend around the said upper surface of the assembly and are secured to the respective sides of the supporting cradle 9, the function of said restraining means being to assist gravity in bracing the graphite blocks against one another to promote the maintenance of contact between adjacent faces of adjacent blocks. As shown, the restraining means includes at least one chain, the end links of which are secured by securing means 14 to the respective sides of the supporting cradle 9 and it is envisaged that the securing means 14 may be constructed as eccentric devices through the rotation of which the tension in the chain may be adjusted or that by the action of springs or torsion rods on eccentric devices the tension in the chain may be regulated during thermal expansions and contractions of the apparatus.

By the provision of suitable means (not shown) the reactor is adapted for the insertion of reactive fuel elements of known kind within the channels 4 in the graphite blocks in the core so that, under the control of a control rod or rods, a self-sustaining chain reaction ensues. The core assembly is also adapted for the continuous flow of gaseous coolant through the channels 4 to withdraw the heat generated therein from the fuel elements. The supporting cradle 9 serves as a thermal shield below the graphite block assembly and the restraining means 13 may serve as or assist in providing a thermal shield above the graphite block assembly.

The corners that project towards one another of the square-section blocks of the core and reflector and of the blocks 12 are chamfered. Thus, referring to FIGURE 2, which shows to a larger scale the four adjacent corners of four adjacent square-section core blocks the corners 8a projecting towards one another of one pair 2a of the blocks are chamfered at 15a while the corners 8b projecting towards one another of the other pair 2b of the blocks are chamfered at 15b.

When the reactor is started up or shut down or there is a change in the rate of heat generation in the reactor and/or a change in the rate of coolant gas flow through the channels 4 the apparatus expands or contracts. Gravity and the action of the restraining means 13 ensure that adjacent faces of the square-section blocks and of the upper peripheral blocks 12 remain in contact under all expected conditions. While the coolant gas flow will normally be distributed between the various channels 4 so that the greater amounts of heat normally released in channels in a central zone of the core do not result in proportionately higher temperatures in the said central zone of the core, nevertheless certain temperature differences may be expected over the cross-section of the graphite block assembly. By virtue of the chamfering of the graphite block corners, however, such temperature differences, with which there correspond differences in the cross-sectional dimensions of the blocks, do not, as they otherwise could, cause separations between adjacent faces of the said blocks. Such separations, where they previously occurred, were due to interferences between corners of blocks projecting towards one another, but FIGURE 3 in which the corners 8a of the blocks 2a have approached one another without interfering, shows that the said separations are avoided with the described construction. Separations between adjacent block faces are avoided whether the dimension or dimensions of one or more blocks is greater or less than that of the other blocks in the inclined directions 16 and/or is greater or less than that of the other blocks in the inclined direction 17 at right angles to the direction 16.

Figure 4:
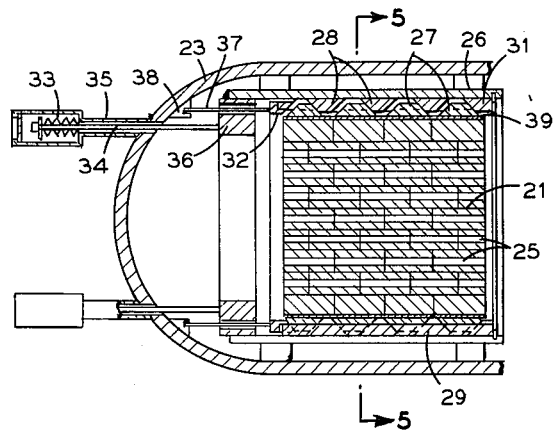
FIGURE 4 is a partial side elevation of a modified form of nuclear reactor core and reflector comprising square-section graphite blocks mounted in a pressure vessel in section on the line 4—4 of FIGURE 5.
Figure 5:
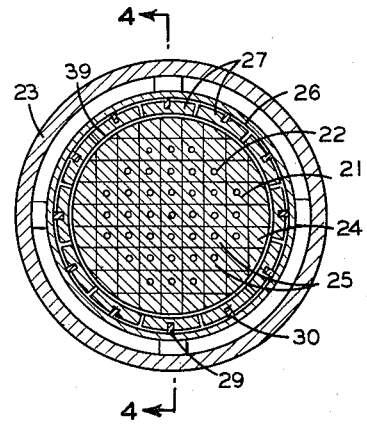
FIGURE 5 is an end elevation of the reactor of FIGURE 4 in section on the line 5—5 of FIGURE 4.

Referring to FIGURES 4 and 5, a gas-cooled, graphite-moderated nuclear reactor includes an assembly 21 of graphite blocks 22 disposed within a cylindrical pressure vessel 23 arranged with its axis horizontal. The graphite block assembly is cylindrical in form and co-axial with the pressure vessel and the component blocks thereof, except the peripheral blocks 24 thereof the radially outer faces of which are shaped to accord with the cylindrical form of the assembly, are manufactured to the same square-cross-section. The blocks are assembled with laterally adjacent faces in contact and with corners of laterally adjacent blocks adjacent, and corners of blocks projecting towards corners of adjacent blocks being chamfered as described with reference to FIGURES 1 to 3. Blocks in the core or chain-reacting region of the reactor are pierced with channels 25 for the accommodation of reactive fuel elements and for the flow past said fuel elements of coolant gas for withdrawing from said fuel elements heat released therein.

The graphite block assembly is located co-axially of the pressure vessel and subjected to radially inwardly directed restraining forces by bracing means which include a bending resistant cylindrical shell 26. This shell is co-axial with the pressure vessel and is spaced from the wall of the pressure vessel and may move axially within the pressure vessel. Between the cylindrical shell 26 and the graphite block assembly, metal restraint wedges 27 are arranged in annular and axial rows and metal compression wedges 28 are also arranged in annular and axial rows.

The restraint wedges 27 are steel blocks the radially inner faces of which conform to the cylindrical outer surface of the graphite block assembly and which are arranged in four annular axially spaced rows and in twelve equiangularly spaced axially extending rows, being maintained in said axially extending rows by respective axially extending guide strips 29 secured to the inner surface of the cylindrical shell 26 which project radially inwardly into slots 30 in the wedges 27. The compression wedges 28 are steel blocks which contact the cylindrical shell 26 with their radially outer faces and are arranged in three annular axially spaced rows alternating with the annular rows of restraint wedges 27 and in twelve equi-angularly spaced axial rows, being maintained in said axial rows by the guide strips 29 which project into slots in the wedges 28. In a modification, the compression wedges 28 do not contact the shell 26 but only the guide strips 29.

Wedge faces of the compression wedges 28 engage corresponding wedge faces of the restraint wedges 27 so that when axial compressive forces are applied to reduce the axial distances between annular rows of the wedges 28, the restraint wedges 27 apply radially inwardly directed restraining forces to the graphite block assembly. Said axial compressive forces are applied through a wedge ring 31 secured to the cylindrical shell 26 at one end of the graphite block assembly and through a second wedge ring 32 at the other end of the graphite block assembly. The wedge rings have wedge faces engaging with wedge faces of adjacent restraint wedges 27. The required axial compressive force is derived from compressions springs 33 arranged outside the pressure vessel and applied to the cylindrical shell 26 through rods 34 which extend in sleeves 35 secured in the pressure vessel. These rods extend through the pressure vessel wall and connect to a further ring 36 secured to the cylindrical shell 26 at the other end thereof from the wedge ring 31, and the said force is resisted within the pressure vessel by rods 37 extending between the wedge ring 32 and abutments 38 within the pressure vessel. The radially inner faces of the restraint wedges 27 bear on axially extending bands of metal sheeting 39 in contact with the cylindrical outer surface of the graphite block assembly, which sheeting is adapted to spread somewhat the forces from the individual resistraint wedges. The sheeting preferably has the same thermal co-efficient of longitudinal expansion as the block assembly.

The pressure vessel is provided with means (not shown) permitting the charging of the channels 25 in the graphite block assembly with appropriate reactive fuel elements while means (not shown) are provided for passing coolant gas through the said channels to remove the generated heat from the fuel elements.

In operation, when the reactor is started up or shut down or the rate of heat release in the reactor is changed and/or the rate of coolant flow through the channels is varied, the apparatus expands or contracts. If the graphite block assembly 21 expands more than the cylindrical shell 26, or the latter contracts more than the former, the relative movements can be accommodated by movements over one another of the wedge faces of the wedges 27 and of the wedges 28 and wedge rings 31 and 32. The axial distances between the restraint wedges 27 increases as the axial distances between the compression wedges 28 and wedge rings 31 and 32 also increase and the springs 33 contract. Therefore, lateral forces between adjacent blocks remain limited, alternatively, if the graphite block assembly 21 expands less than the cylindrical shell 26 or the latter contracts less than the former, the said wedge faces move over one another in the opposite sense with the said axial distances decreasing and the springs 33 expanding. Inwardly directed restraining forces remain applied to the graphite block assembly and the graphite blocks remain braced against one another without gaps therebetween. The arrangement permits the graphite block assembly to expand or contract more at some vertical cross-sections than at others with maintenance of radially inwardly directed restraining forces. If some graphite blocks expand or contract more than others, breakage of side face contacts due to interference between corners projecting towards one another of adjacent blocks is prevented by virtue of the chamfering of said corners. The graphite block assembly remains co-axial of the cylindrical shell.

Figure 6:
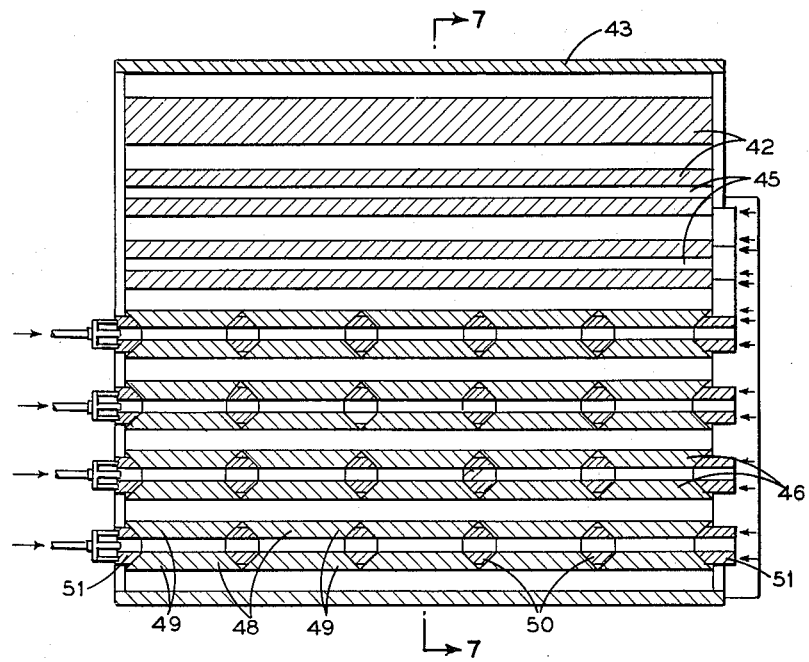
FIGURE 6 is a side elevation of a modified form of nuclear reactor core and reflector comprising regular hexagonal section blocks in section on the line 6—6 of FIGURE 7.
Figure 7:
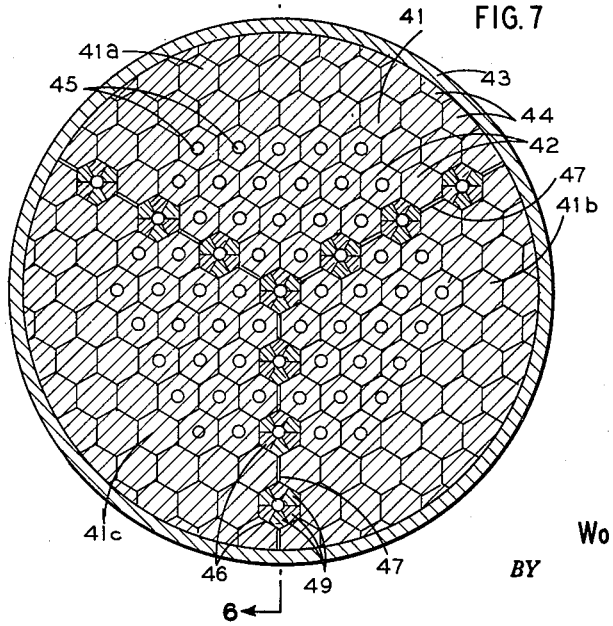
FIGURE 7 is an end elevation of the core and reflector of FIGURE 6 in section on the line 7—7 of FIGURE 6.

Referring to FIGURES 6 and 7, an assembly 41 of graphite blocks 42 providing the moderator of a gas-cooled nuclear reactor is accommodated in a bending resistant cylindrical shell 43. The graphite blocks extend parallel to the axis of the cylindrical shell and are prisms and are arranged with the plane side faces of adjacent blocks in contact and with corners of adjacent blocks adjacent. With the exception of the peripheral graphite blocks 44 of the assembly, the graphite blocks are of regular hexagonal cross-section and the said peripheral graphite blocks 44 have the same cross-section but are modified so that the outer peripheral surface of the assembly may be cylindrical and conform to the inner surface of the cylindrical shell 43.

Each graphite block in a radially inner region of the assembly is axially pierced by a respective channel 45 in order that the said region may constitute the core or chain-reacting region of the reactor when reactive fuel elements (not shown) are inserted in the channels 45, which also serve for the passage of coolant gas therealong to remove the heat generated in operation by the fuel elements. The remaining graphite blocks are unpierced and serve as the reflector.

The places of certain of the hexagonal graphite blocks in the assembly are taken by respective hexagonal adjustable laterally expandable bracing units 46 each of which is adapted to bear radially outwardly from its own axis on the adjacent faces of the graphite blocks adjacent thereto. One bracing unit 46 is central, its axis being the axis of the assembly, while the axes of the other bracing units 46 lie in three planes through the assembly axis and 120° apart. In each of said axial planes lie bracing units 46 spaced as close to one another as may be in a radial row extending between the assembly axis and the assembly periphery. It will be observed that so far as permitted by the cylindrical shell 43 simultaneous lateral expansion of all the bracing units 46 will cause the three cylindrical sectors 41a, 41b and 41c bounded by the three radial rows of bracing units 46 to move away from one another, gaps 47 being formed or increased between the adjacent faces of adjacent graphite blocks in different sectors.

Each bracing unit 46 comprises five assemblages 48 each composed of six axially extending metal contact bars 49 arranged in a cylindrical ring and adapted to bear with their surfaces facing radially outwardly of the bracing unit on the side faces of adjacent graphite blocks. Between each pair of adjacent ends of adjacent assemblages 48 in each bracing unit 46 is a hexagonal internal metal compression wedge 50, six wedge faces at one end of which engage respective wedge faces at the adjacent edges of the respective bars 49 of one assemblage 48 and six wedge faces at the other end of which wedge 50 engage respective wedge faces at the adjacent ends of the respective bars 49 of the other assemblage 48. At the two ends of each bracing unit 46 are hexagonal external metal compression wedges 51 each providing six wedge faces which engage respective wedge faces at the adjacent ends of the respective bars 49 of the adjacent assemblage 48. Means (not shown) are provided for applying in a resilient manner as by means of springs compression forces between the two external compression wedges 51 associated with each bracing unit 46. Such compression forces tend by reason of the engagements between the wedge faces of the compression wedges 50 and 51 and the wedge faces of the bars 49 to drive the said bars radially outwardly from the axis of the bracing unit so that the bracing unit tends to expand laterally.

For the nuclear reactor there are provided means (not shown) for charging the channels 45 with appropriate reactive fuel elements and for passing coolant gas through the said channels.

In operation, when the reactor is started up or shut down or the rate of heat release in the reactor is changed and/or the rate of coolant flow through the channels is varied the apparatus expands or contracts. If the graphite block assembly 41 expands more or contracts less than the cylindrical shell 43, the increased lateral forces between the blocks in the assembly are limited by lateral contractions of the bracing units 46 the compression wedges 50 of which move apart from one another, and from wedges 51, axially against the applied axial compression forces, whereby the gaps 47 between the three cylindrical sectors 41a, 41b and 41c of the graphite block assembly are reduced. Alternatively, if the graphite block assembly 41 expands less or contracts more than the cylindrical shell 43, the bracing units 46, the compression wedges 50 of which move towards one another, and towards the wedges 51, axially under the applied axial compression forces, laterally expand and ensure that all the graphite blocks in each of the three cylindrical sectors 41a, 41b and 41c of the graphite block assembly remain braced against one another without gaps therebetween, the gaps 47 between the said sectors being increased. The block assembly remains co-axial of the cylindrical shell.

It is envisaged that it may be possible to form all or some parts of the bracing units 46 of moderator material such as beryllium, beryllium oxide or graphite.

While in accordance with the provisions of the statutes we have illustrated and described herein the best forms and modes of operation of the invention now known to us, those skilled in the art will understand that changes may be made in the forms of the apparatus disclosed without departing from the spirit of the invention covered by our claims, and that certain features of our invention may sometimes be used to advantage without a corresponding use of other features.

What is claimed is:

1. In a nuclear reactor comprising a cylindrical pressure vessel, a cylindrical shell disposed coaxially within said pressure vessel and axially movable therein a generally cylindrical core assembly comprising a plurality of moderator blocks having side faces parallel to said core axis arranged within said cylindrical shell, means surrounding the radial periphery of said core assembly and closely embracing the outer radial surface of said core assembly, means arranged at the outer surface of said embracing means within said cylindrical shell acting laterally inwardly through said embracing means upon said moderator blocks perpendicular to the plane side faces laterally forcing adjacent blocks against one another, said means having a plurality of restraint wedges arranged along and around the outer surface of said embracing means, and a plurality of compression wedges coacting with said restraint wedges and transmitting a portion of the lateral reactive force from said moderator blocks to said cylindrical shell and a portion to the longitudinal movement of said shell, and means for resiliently attaching said shell to said pressure vessel to resist the axial movement of said shell in said pressure vessel.

2. In a nuclear reactor comprising a cylindrical pressure vessel, a cylindrical shell disposed coaxially within said pressure vessel and axially movable therein, a generally cylindrical core assembly having coaxial forces acting thereon and comprising a plurality of moderator blocks having side faces parallel to said core axis arranged within said cylindrical shell, means surrounding the radial periphery of said core assembly and closely embracing the outer radial surface of said core assembly, means arranged at the outer surface of said embracing means within said cylindrical shell acting laterally inwardly through said embacing means upon said moderator blocks perpendicular to the plane side faces laterally forcing adjacent blocks against one another, said means having a plurality of restraint wedges arranged along and around the outer surface of said embracing means, and a plurality of compression wedges coacting with said restraint wedges to apply a portion of said coaxial forces to said means effecting said lateral force and transmitting a lateral reactive force to said cylindrical shell, and means for resiliently attaching said shell to said pressure vessel.

References Cited by the Examiner

UNITED STATES PATENTS

| | | | |
|---|---|---|---|
| 2,838,451 | 6/1958 | Long et al. | 176—41 |
| 2,970,097 | 1/1961 | Correc | 176—41 |
| 3,009,869 | 11/1961 | Bassett | 176—68 |
| 3,010,888 | 11/1961 | Battle | 176—84 |

FOREIGN PATENTS

| | | |
|---|---|---|
| 1,198,353 | 6/1959 | France. |

(Corresponding U.S. Patent 3,115,448, August 1958.)

| | | |
|---|---|---|
| 1,214,246 | 11/1959 | France. |
| 874,018 | 8/1961 | Great Britain. |

CARL D. QUARFORTH, *Primary Examiner.*

REUBEN EPSTEIN, *Examiner.*